UNITED STATES PATENT OFFICE.

PIERRE PROSPER MONNET, OF LYONS, FRANCE, ASSIGNOR TO LA SOCIÉTÉ CHIMIQUE DES USINES DU RHÔNE, ANCIENNEMENT GILLIARD P. MONNET ET CARTIER, OF SAME PLACE.

PROCESS OF MAKING CHLORIN DERIVATIVES OF TOLUENE.

SPECIFICATION forming part of Letters Patent No. 606,470, dated June 28, 1898.

Application filed November 22, 1897. Serial No. 659,514. (No specimens.) Patented in England December 24, 1896, No. 29,717.

*To all whom it may concern:*

Be it known that I, PIERRE PROSPER MONNET, of Lyons, France, have invented certain new and useful Improvements in the Manufacture of Chlorin Derivatives of Toluene, (for which I have obtained a patent in Great Britain, No. 29,717, bearing date December 24, 1896,) of which the following is a specification.

This invention relates to the manufacture of ortho and para chlorbenzylidene chlorids (ortho and para chlorbenzal chlorids, $C_6H_4Cl.CHCl_2$) and other chlorin derivatives of toluene from ortho and para toluene sulfo chlorids.

The chlorin derivatives of toluene, and especially ortho and para chlorbenzylidene chlorid, are employed in the arts for the preparation of aromatic aldehydes and acids and other complex compounds. Their preparation is generally effected by indirect and expensive methods. For instance, orthochlorbenzylidene chlorid is at present manufactured from orthotoluidin, which is converted by the Sandmeyer reaction into orthochlortoluene. When this body is further heated with chlorin at a higher temperature in the presence of phosphorus pentachlorid, it yields a mixture of various chlorin compounds, of which orthochlorbenzylidene chlorid is the chief. Recent improvements, however, in the manufacture of toluene sulfo chlorids, and especially of orthotoluene sulfo chlorid, from toluene by means of chlorsulfonic acid has drawn attention to the sulfo chlorids as possibly a cheaper and more profitable source than toluidin for the preparation of chlorin derivatives of toluene, and especially of orthochlorbenzylidene chlorid.

In the specification of British Letters Patent No. 6,626 of 1885 Fahlberg states that when the solid paratoluene sulfo chlorid is mixed with carbon, moistened, and subjected to the action of superheated steam under pressure it is decomposed into toluene, hydrochloric acid, and sulfurous acid.

I have discovered that when pure ortho or para toluene sulfo chlorid is distilled alone at ordinary pressure it is decomposed with formation of sulfurous acid and the respective ortho or para chlortoluene. A part of the sulfo chlorid is at the same time further decomposed. I have further discovered that the sulfurous acid may be split off more easily and without any more fundamental decomposition and at a lower temperature (about 150° centigrade instead of 250° centigrade) by conducting a stream of dry chlorin gas through the heated toluene sulfo chlorid. By this method it is possible to obtain a good yield of ortho or para chlorbenzylidene chlorid from ortho or para toluene sulfo chlorid, respectively, in one operation.

The following example will show how the invention is to be carried out with regard to the production of orthochlorbenzylidene chlorid (orthchlorbenzal chlorid, $C_6H_4Cl.CHCl_2$) from orthotoluene sulfo chlorid.

The orthotoluene sulfo chlorid is heated to 150° centigrade, and a stream of dry chlorin gas is conducted into the hot liquor, which is maintained during the operation at a temperature between 150° centigrade and 200° centigrade. At first the mass decreases slightly in weight as sulfurous acid is evolved; but it soon ceases to lose in weight and ultimately regains its original weight, as the loss of sulfurous acid is compensated for by absorption of chlorin, the two reactions going on simultaneously.

The paratoluene sulfo chlorid may be treated in a similar manner to obtain the corresponding chlorbenzylidene chlorid; but in this case it is more difficult to regulate the reaction, and a large quantity of parachlorbenzotri chlorid is always formed. When the reaction is finished, which is the case when two molecular proportions of chlorin have been absorbed by the mass, the product is distilled. In the case of the ortho product this may be done at ordinary pressure, when orthochlorbenzylidene chlorid passes over between 225° and 235° centigrade. The distillate when treated with one hundred per cent. sulfuric acid yields very pure orthochlorbenzoic aldehyde. The product of the treatment of paratoluene sulfo chlorid is preferably distilled under reduced pressure and the fraction, distilling between 155° centigrade and 165° centigrade at sixty millimeters pressure, collected. On treatment with sulfuric acid this product yields parachlorbenzoic acid melting at 236° centigrade.

The chlorination proceeds more rapidly if a small quantity of phosphorus pentachlorid is added to the mass, and naturally more or less chlorinated products may be obtained, according to the quantity of chlorin employed.

What I claim, and desire to secure by Letters Patent, is—

1. The method or process of preparing chlorin derivatives of toluene from the ortho or para toluene sulfo chlorid which consists in treating ortho or para toluene sulfo chlorid when heated with a current of dry chlorin gas, substantially as described.

2. The method or process of manufacturing chlorin derivatives of toluene from the ortho or para toluene sulfo chlorid, which consists in passing into the said sulfo chlorid heated to 150° centigrade a stream of dry chlorin gas, and maintaining the reaction at 150° to 200° centigrade until the required quantity of chlorin has been absorbed, and purifying the resulting product, substantially as described.

In witness whereof I have hereunto signed my name in the presence of two subscribing witnesses.

PIERRE PROSPER MONNET.

Witnesses:
RODOLPHE PFISTER,
EURITE MARQUETANT.